(12) United States Patent
Morgan

(10) Patent No.: X7530
(45) Date of Patent: Apr. 12, 1833

(54) PRESERVING TIMBER, &C.

(76) Inventor: Charles Morgan

Charles Morgan

Letters Patent

The Schedule referred to in these Letters Patent and making part of the same containing a description in the words of the said Charles Morgan [illegible] of his improvement in the process for preserving Timber and all kinds of Wood.

A cistern of Brick wood stone or what ever, must be erected for the purpose, of suitable dimensions for holding the quantity of the various Timber to be prepared. The Timber either hewed or sawed is then placed in the cistern the largest pieces undermost [illegible] piece to be [illegible] from the other one inch or more and the bottom ones to be clear [illegible] three inches from the bottom. Should plank be put in at the same time they must occupy the uppermost tiers and be placed on edge. The cistern if necessary there may be as many cisterns as required should one not be sufficient must then be filled with rain or river water so as to cover all the timber from [illegible] inches to 18 inches, to which add a sufficient quantity of fresh burnt quick lime to saturate the water, a few ounces to each gallon of water will be sufficient. The top of the cistern being open more or less of the water will be [illegible] by evaporation which must be replaced from time to time with fresh water as the cistern must always be kept full. The same precaution must also obtain in respect to the same. The carbonic acid being attracted from the atmosphere by the lime, will form a thin crust or pellicle of the carbonate of lime on the surface of the water, which after a time will be precipitated and replaced by another crust or pellicle which will also be precipitated until finally all the lime in solution will become changed into a carbonate [illegible]. It will be necessary to add a small quantity of fresh lime every few months. It is the opinion of the Petitioner founded on several years successful experiments that all kinds of wood sawed into plank from one to four inches thick can be perfectly prepared [illegible] in this way in from six to twelve months and that larger timber such as logs of a foot square more or [illegible] would also in like manner be completely saturated in from two to three years.

The Petitioner thinks from his own observations on this experiment that wood prepared in this way would remain sound and free from any decay whatever in any use it might be put to [illegible] [illegible] or perhaps even a longer time than it would otherwise, however well seasoned it might be. The same principles also obtains in the use of a composition as a Cement or wash of equal parts of lime, ashes of wood, salt and Molasses reduced to a proper consistency with water and applied as a wash to shingle roofs two or three coats of which will be sufficient to protect the roof from decay many years longer than it would otherwise and longer also than paint and oil would preserve. It is a well ascertained fact in the destructive distillation of any kind of wood an acid is obtained now known by the name of pyroligneous acid which in reality is the acetic acid combined with empyreumatic oil and bitumen. The acetic acid readily unites with all the alkalies and most of the earths Hence it is that the lime in the form of a hydrate instantly neutralizes the wood acid forming an acetate of lime by which chemical combination, the process of vegetable decomposition and putrefaction in the wood is thus prevented for a great length of time. Whatever may be the rationale the effect is certainly a matter of fact Charles Morgan Witness
[illegible] [illegible]
Samuel [illegible]

[illegible]